United States Patent [19]
Yamamoto

[11] Patent Number: 6,108,456
[45] Date of Patent: *Aug. 22, 2000

[54] IMAGE PROCESSING SYSTEM

[75] Inventor: Tadashi Yamamoto, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/733,010

[22] Filed: Oct. 16, 1996

[30] Foreign Application Priority Data

Oct. 20, 1995 [JP] Japan ................................. 7-272394

[51] Int. Cl.[7] ........................................ G06K 9/38
[52] U.S. Cl. ..................... 382/270; 382/272; 358/464; 358/466
[58] Field of Search ..................... 358/471, 472, 358/464, 465, 466; 382/254, 270, 272

[56] References Cited

U.S. PATENT DOCUMENTS

| | | | |
|---|---|---|---|
| 4,205,345 | 5/1980 | van der Houwen et al. | 358/168 |
| 4,593,325 | 6/1986 | Kannapell et al. | 358/466 |
| 4,941,188 | 7/1990 | Yamada | 382/50 |

FOREIGN PATENT DOCUMENTS

| | | |
|---|---|---|
| 0641115A1 | 3/1995 | European Pat. Off. . |
| 2152326A | 7/1985 | United Kingdom . |

*Primary Examiner*—Thomas D. Lee
*Attorney, Agent, or Firm*—Fitzpatrick, Cella, Harper & Scinto

[57] ABSTRACT

There is disclosed an image processing apparatus such that after completion of one scan of a scanner unit, a controller obtains a background value in a range to be read by one scan from an image processing IC and compares the background value with a binarization threshold value used in the present scan, and when it is equal to or less than a predetermined value, the background value is used in the next scan, and when it is equal to or larger than the predetermined value, by correcting the threshold value, an image can be read at a high quality.

22 Claims, 4 Drawing Sheets

IMAGE PROCESSING SYSTEM

BACKGROUND OF THE INVENTION

1. Field of the Invention

The invention relates to an image processing system for binarizing an image signal obtained by reading an image of an original.

2. Related Background Art

Hitherto, as an image reading apparatus, there is an apparatus such that an original reading function is added to a word processor. For example, a scanner unit having therein a line image sensor is installed to a carriage for a serial thermal transfer printer and by setting a reading original in place of a printer recording paper, the original is read. In such an apparatus, an image existing in an area of (reading width of the line image sensor)×(one scanning width of the carriage) is read by one scan of the carriage, the reading original is subsequently fed in the direction which perpendicularly crosses the carriage scanning direction by a distance of the reading width of the line image sensor, and after that, the carriage is scanned once, thereby reading an image of the same area as mentioned above. By repeating the above operations, an original image of a desired area can be read.

There is also a multifunction printer such that a scanner cartridge of the same shape is installed in place of an ink cartridge on a carriage of an ink jet printer and an original image can be read by an operation similar to that of the serial thermal transfer printer.

According to the serial scanner system as mentioned above, since the number of reading elements of the line image sensor is smaller than that of the line scanner system using the line image sensor having pixels of the number corresponding to the original width like a flat bed scanner, a small sensor or optical system can be used. Since an original paper feeding system and the carriage can commonly use a mechanism of the printer as it is, there is no need to buy both of the printer and the scanner. As mentioned above, the user can fairly cheaply get the original reading function. A hand-written illustration or a photograph which was read by the reading function can be inserted into an original document or an original can be read for an OCR or a facsimile apparatus.

When an original to be read is not a photograph having gradations but a monochromatic characters or illustration, multivalue data from the line image sensor is ordinarily binarized by a predetermined threshold value. In this case, there is a problem such that a background (white background of a paper in case of an ordinary character original) of the original to be read is not constant. As an original, there is a high quality paper, a recycling paper, a rough paper, a newspaper, a colored paper, or the like. Even when characters or lines of the same black are drawn, when they are binarized by the same threshold value, there is a case where the line is made faint and patchy or is thickened, so that the characters or the like cannot be correctly read.

A conventional binarization reading apparatus such as a facsimile or the like has a background control function. FIG. 2 shows a background control of the facsimile or the like. Multivalue data before a binarizing process from the left side is first inputted to a terminal B of a comparator 201. A count value of a counter 202, which will be explained hereinlater, is inputted to a terminal A of the comparator 201. FIG. 2 shows an example in which as a color becomes white, a data value increases. As a result of a comparison, when A>B, "1" is subtracted from the count value of the counter 202 and, when A<B, "1" is added to the count value. Such a process is not performed every pixel but is executed while being thinned out by thinning-out units 203 and 204. This is because it is necessary to prevent a situation such that a binarization threshold value, which will be explained hereinlater, excessively changes and exerts an adverse influence on the binarization result. Since most of the area of the ordinary original to be read corresponds to a background, the value of the counter 202 is converged to a value of the background. Such a value is divided into ½ by a divider 205, thereby setting to a binary threshold value. The multivalue data before the binarizing process is binarized by a comparator 206.

In a line scanner like a flat bed scanner, even if the background changes even in one original in the foregoing background control system, the threshold value smoothly changes every line scan of the line sensor, so that a good binarization result is obtained.

According to the serial scanner as mentioned above, however, although the threshold value smoothly changes in the scanning direction of the carriage (subscanning direction of the line sensor), a large difference occurs in the threshold values between adjacent scanning areas, so that there is a case where an unnaturality occurs in the binarization result. For example, as a result of that a line on the original is read, if the line exists in the adjacent scanning areas, there is an unnaturality such that the line width suddenly changes or the like.

SUMMARY OF THE INVENTION

It is an object of the invention to provide an image processing system which can perform an image process at a high picture quality.

Another object of the invention is to provide an image processing system using a serial scanner which can perform a binarization so that images in adjacent scanning ranges become natural.

To accomplish the above objects, according to an embodiment of the invention, there is provided an image processing system comprising: a reading unit having therein a line sensor; first moving means for relatively moving the reading unit and an original in the subscanning direction of the line sensor; second moving means for relatively moving the reading unit and the original in the main scanning direction of the line sensor; control means for controlling in a manner such that the reading unit scans a first range on the original by the first moving means, a relative movement by the second moving means is performed, and further, the reading unit scans a second reading range adjacent to the first reading range by the first moving means; detecting means for detecting a background density of the original; determining means for detecting a background density in the first reading range by the detecting means and for determining a binarization threshold value which is used in the second reading range on the basis of an output of the detecting means and a present binarization threshold value; and binarizing means for binarizing an image signal read by the reading unit by the binarization threshold value that is determined by the determining means.

By constructing as mentioned above, an original image can be read by using a compact reading unit and a natural image output of a high quality can be also obtained.

The above and other objects and features of the present invention will become apparent from the following detailed description and the appended claims with reference to the accompanying drawings.

DETAILED DESCRIPTION OF THE PREFERRED EMBODIMENT

Figure 3:
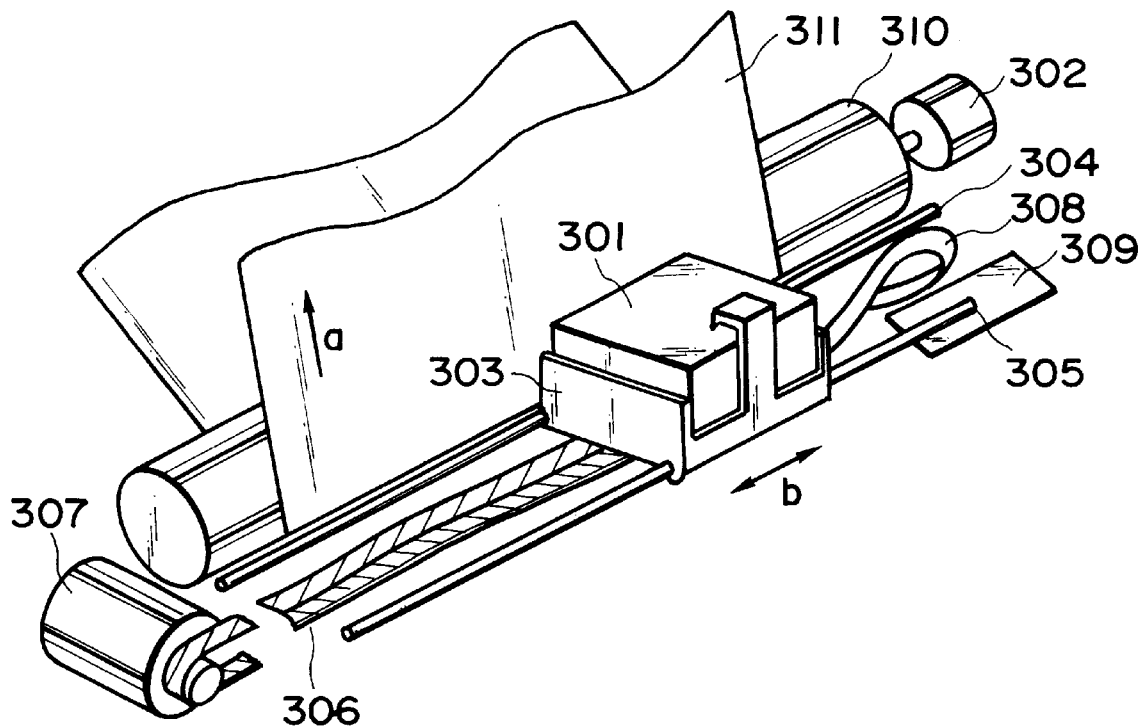
FIG. 3 is a diagram showing a schematic construction of a main section of the embodiment.

FIG. 3 shows a schematic construction of a main section of a "serial scanner apparatus" as an embodiment. In FIG. 3, reference numeral 301 denotes a recording head having 128 ink emission ports. The recording head 301 is detachable for a carriage 303. Reference numerals 304 and 305 denote guide shafts to movably hold the carriage 303 in the axial direction; 306 a belt to transfer a driving force of a carriage motor 307 to the carriage 303 in order to reciprocate the carriage 303 along the guide shafts 304 and 305 in the direction shown by arrows b; 308 a flexible printed card (FPC) to electrically connect the recording head 301 and a control board 309; and 310 a paper feed roller which is rotated by a roller motor 302 and conveys a recording paper 311 in the direction shown by an arrow a.

The recording operation of an image will now be described. As mentioned above, the recording head 301 has 128 ink emission ports. When the carriage 303 scans once from the left to the right in the diagram, dots of maximum 128 lines are recorded on the recording paper 311. After completion of one scan of the carriage 303 from the left to the right in the diagram, the paper feed roller 310 rotates and conveys the recording paper 311 by a distance of the recording width (dot width of 128 lines). The carriage 303 is moved from the right to the left in the diagram, thereby preparing for the next image recording. By repeating the scan of the carriage 303 and the conveyance of the recording paper 311 a plurality of number of times, a desired recording is executed to the recording paper 311.

As mentioned above, the recording head 301 is detachable for the carriage 303. In the apparatus of the embodiment, in place of the recording head 301, a scanner unit 402 (refer to FIG. 4) can be attached to the carriage 303. The scanner unit 402 photoelectrically converts an image of the original to be read which is conveyed by the paper feed roller 310 in place of the recording paper 311 and generates an electric signal.

Figure 4:
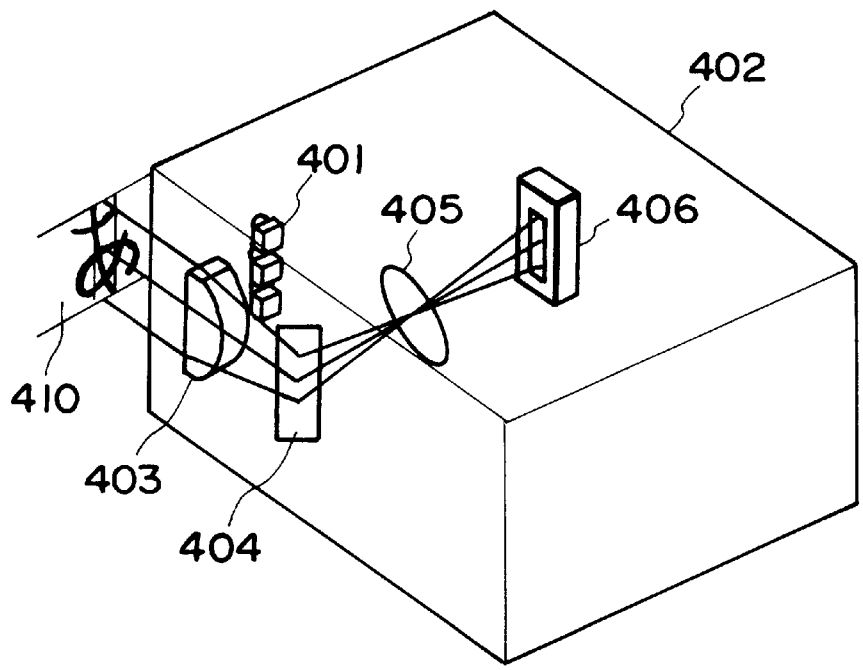
FIG. 4 is a diagram showing a construction of an optical system of the scanner unit in the embodiment.

In FIG. 4, reference numeral 401 denotes an LED to expose an original 410 to be read; 403 a field lens to converge a reflected light from the original 410; 404 a mirror to curve the optical axial direction by 90°; and 405 a master lens to guide the reflected light from the original which was exposed by the LED 401 to a line image sensor 406. The line image sensor 406 has 128 photoelectric converting elements arranged on one line and generates an analog image signal at a level corresponding to a light/dark state of the original image.

The reading operation to attach the scanner unit 402 to the carriage 303 in place of the recording head 301 and to read the original image will now be described hereinbelow.

The original is conveyed to a predetermined reading position by the paper feed roller 310 in place of the recording paper 311. The carriage 303 to which the scanner unit 402 is attached scans from the left to the right in FIG. 3 in a manner similar to the foregoing recording operation. Thus, the image on the original is read by the line image sensor 406 by the width of 128 pixels. It is now assumed that the scan is executed in the direction which perpendicularly crosses the arranging direction (main scanning direction) of the line image sensor 406, namely, in the subscanning direction. After completion of one scan of the carriage 303 from the left to the right in the diagram, the paper feed roller 310 rotates, conveys the original in the main scanning direction of the sensor by a distance of 128 pixels, moves the carriage 303 from the right to the left in the diagram, and prepares for the next image reading operation. By repetitively executing the scan of the carriage 303 and the conveyance of the original a plurality of number of times, the image of the original is read.

Figure 5:
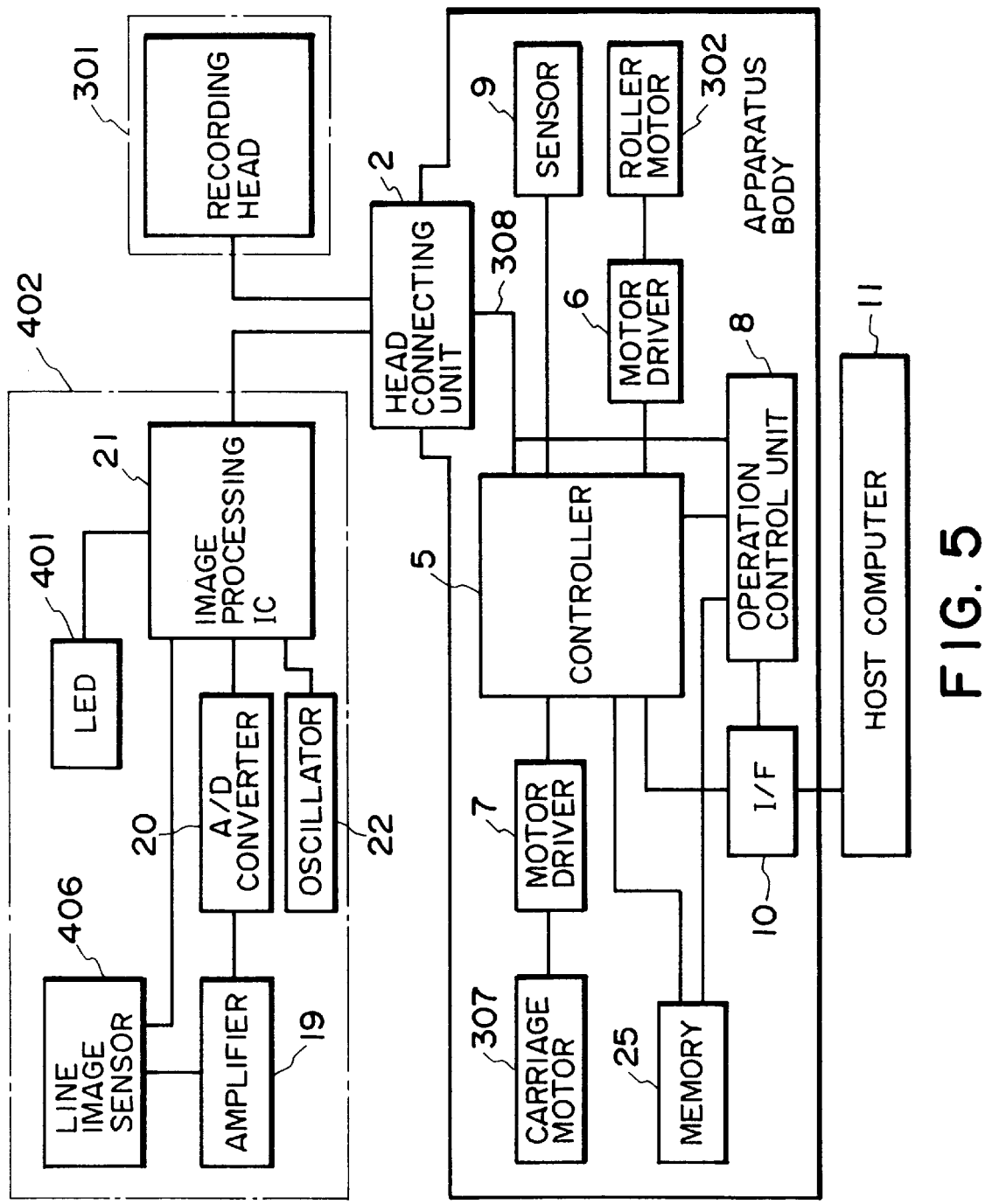
FIG. 5 is a block diagram showing a whole construction of the embodiment.

FIG. 5 is a block diagram showing a whole construction of a serial scanner apparatus. The recording head 301 or scanner unit 402 is connected to a head connecting unit 2 in accordance with the use object.

The operation in case of using the present apparatus as a recording apparatus will now be described together with an explanation of a function and a structure of each block. In this case, the recording head 301 is connected to the connecting unit 2.

Recording data which is required for recording (or printing; hereinafter, referred to as "recording") characters, an image, or the like is transferred from a host computer 11 through an interface (I/F) 10 while being controlled by the host computer 11 and an operation control unit 8. A controller 5 receives the recording data and processes it into dot data to record dots onto the recording paper by the recording head 301, and stores the dot data after it was processed into a memory 25. Further, the controller 5 reads out the dot data from the memory 25 while being controlled by the operation control unit 8, supplies the dot data to the recording head 301 through the head connecting line 308 (FPC in FIG. 3) and head connecting unit 2, and records the characters, image, or the like onto the recording paper 311 by dots.

The roller motor 302 is driven by a motor driver 6 which is controlled by the operation control unit 8 and controller 5 and conveys the recording paper 311.

The carriage 303 is moved by the carriage motor 307 which is driven by a motor driver 7 that is controlled by the operation control unit 8 and controller 5.

A sensor 9 detects whether the recording paper 311 or the original to be read has been set on a paper holding base plate (not shown) or not and, further, whether the carriage 303 is located at a start position or not, and the like.

Not only the data of the characters, image, or the like mentioned above but also various parameters regarding the image recording and original reading are inputted from the host computer 11 to the interface 10. The operation control unit 8 executes various control operations for the image recording and the original reading in accordance with the various parameters.

The operation in case of using the present apparatus as an image reading apparatus will now be described. In this case, the scanner unit 402 is connected to the head connecting unit 2.

Even when the apparatus operates as an image reading apparatus as mentioned above, the scanner unit 402 scans the original in a manner similar to the case where the recording head 301 operated upon recording. The LED 401 in the scanner unit 402 exposes the original and the line image sensor 406 having photoelectric converting characteristics detects the reflected light of the characters, image, or the like. The signal detected by the line image sensor 406 is amplified by an amplifier 19 to the optimum level among the levels which are treated by an analog/digital converter (hereinafter, simply referred to as an A/D converter) 20 and is inputted to the A/D converter 20. The converted digital data is subjected to a shading correction, an edge emphasis, and a binarizing process, which will be explained hereinlater, by an image processing IC 21 and is transferred as image data to the apparatus body.

In this instance, the image data is sent to the host computer 11 through a path opposite to that of a flow of the recording data upon recording mentioned above. Namely, the image data is transferred from the image processing IC 21 and is stored into the memory 25 through the head connecting unit 2, head connecting line 308, and controller 5. Further, the controller 5 sends image data to the host computer 11 through the interface 10. In this instance, the controller 5 converts the image data received from the image processing IC 21 to data of a form which can be easily treated by the interface 10 or host computer 11 and transfers while being controlled by the operation control unit 8.

Figure 1:
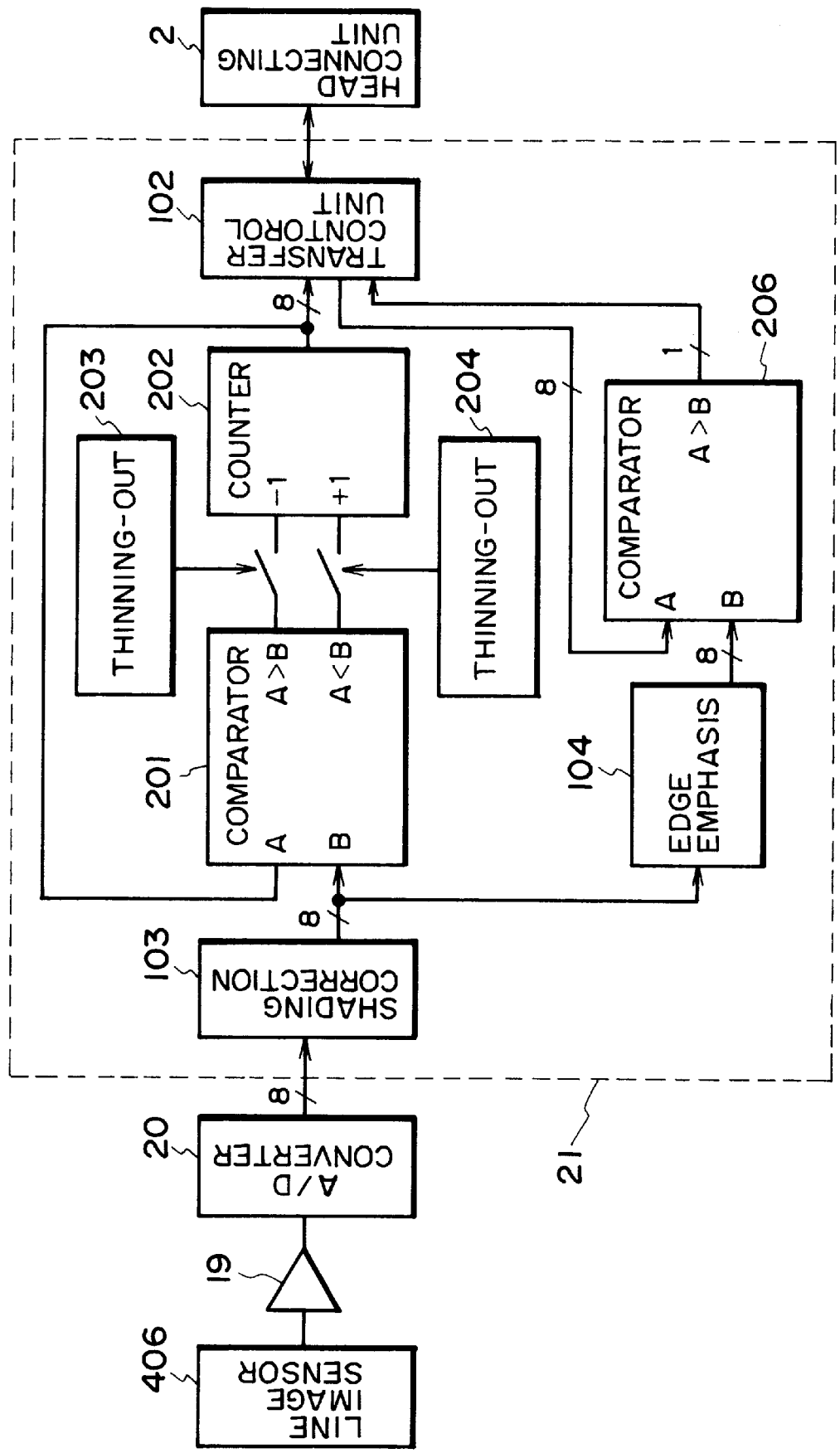
FIG. 1 is a block diagram of a scanner unit in an embodiment.
Figure 2:
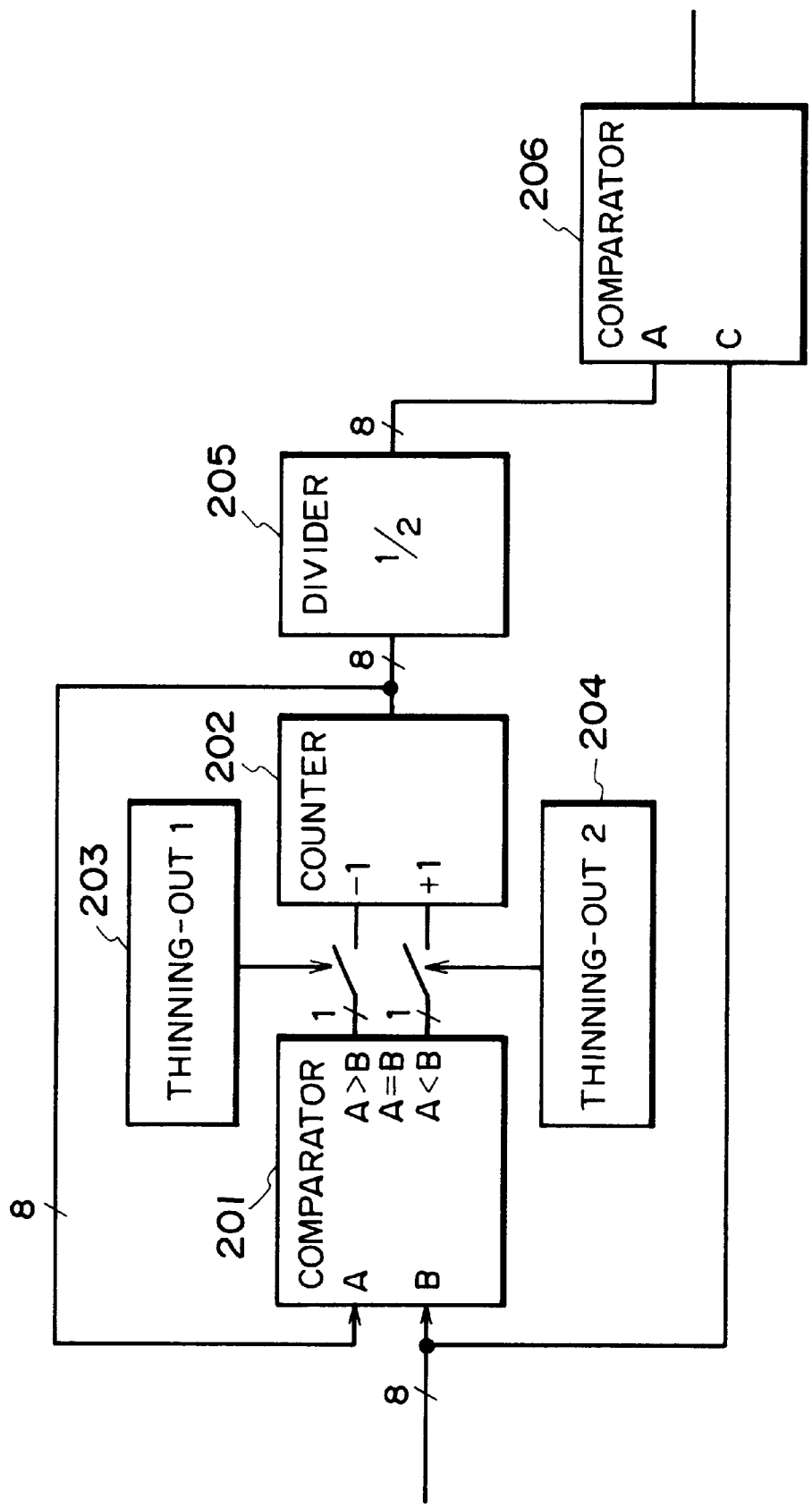
FIG. 2 is a block diagram for explaining a conventional binarizing process.

The binarizing process will now be described. FIG. 1 is a block diagram in the scanner unit 402. The digital data which was A/D converted as mentioned in the foregoing conventional technique is supplied to the image processing IC 21 and is amplified and, after that, it is shading corrected by a shading correction circuit 103. The shading corrected data is processed by the comparator 201, thinning-out units 203 and 204, and counter 202 in a manner as described in the foregoing related art. The thinning-out unit 203 operates so as to turn on the switch once per 16 pixels. The thinning-out unit 204 operates so as to turn on the switch once per 64 pixels. As mentioned above, the value of the counter 202 is converged to a value corresponding to the background density of the original as mentioned above. The counter value can be transferred to the controller 5 through a transfer control unit 102, the head connecting unit 2, and head connecting line 308 by a request from the controller 5 of the apparatus body. The controller 5 can set an A input value of the comparator 206, namely, a binarization threshold value through the head connecting line 308, head connecting unit 2, and transfer control unit 102. When the serial scanner apparatus reads the original, the controller 5 sets various parameters necessary for reading, controls the motor 307 so as to scan the carriage 303 once, and reads the image data as much as one scan. After completion of one scan, the controller 5 requests the image processing IC 21 to obtain the value of the counter 202, namely, a background value in a range where it is read by one scan, executes a predetermined process by using the operation control unit 8, and obtains a value smaller than the background value. In the embodiment, a process of ½ is executed. The resultant value is compared with the binarization threshold value used in the present one scan. When a difference between them is equal to or less than a predetermined value (in the embodiment, 3), such a value is set to the binarization threshold value of the next reading scan. When the difference is equal to or larger than the predetermined value and is larger than the binarization threshold value used in the present one scan, 3 is added to the binarization threshold value of the next reading scan. When it is smaller than the binarization threshold value, 3 is subtracted from the binarization threshold value. The threshold value obtained as mentioned above is set to an A input of the comparator 206.

After that or while the arithmetic operation of the binarization threshold value mentioned above is performed, the paper feed roller 310 rotates and conveys the original by a distance of 128 pixels. The next reading scan is performed. By repeating the above operations, a desired range of the original is read and the binarization is performed.

According to the embodiment as mentioned above, a large difference of the binarization threshold value is eliminated between the adjacent reading scans of the scanner unit. A good binary image without unnaturality between the adjacent scans is obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing system comprising:
   a reading unit having a line sensor;
   first moving means for relatively moving said reading unit and an original image in a subscanning direction of said line sensor;
   second moving means for relatively moving said reading unit and said original image in a main scanning direction of said line sensor;
   control means for controlling in a manner such that said reading unit reads a first reading range on said original image through the relative movement by said first moving means, the relative movement by said second moving means being performed after reading the first reading range, and subsequently said reading unit reads a second reading range adjacent to said first reading range in the main scanning direction through the relative movement by said first moving means;
   detecting means for detecting a background density of said original image;
   determining means for detecting a background density in said first reading range by said detecting means on the basis of read data in said first reading range and for determining a binarization threshold value of said second reading range on the basis of the background density detected by said detecting means and a present binarization threshold value of said first reading range before starting to read said second reading range; and
   binarizing control means for binarizing an image signal of said second reading range read by said reading unit using the binarization threshold value which is determined by said determining means before the reading of said second reading range.

2. A system according to claim 1, wherein said determining means determines the binarization threshold value so that a difference between the present binarization threshold value and the binarization threshold value which is used in said second reading range does not exceed a predetermined value.

3. A system according to claim 1, wherein said main scanning direction is an arranging direction of said line sensor and said subscanning direction is a direction that perpendicularly crosses said main scanning direction.

4. A system according to claim 1, wherein said detecting means is provided in said reading unit.

5. A system according to claim 1, wherein said determining means is provided in said reading unit.

6. A system according to claim 1, wherein said binarizing control means is provided in said reading unit.

7. A system according to claim 1, wherein said reading unit includes therein a light source to irradiate said original image.

8. A system according to claim 7, wherein said reading unit includes therein optical means for guiding a reflected light from said original irradiated by said light source to said line sensor.

9. A system according to claim 8, wherein said reading unit includes therein amplifying means for amplifying an image signal which is outputted from said line sensor.

10. A system according to claim 1, further comprising a printing unit.

11. A system according to claim 10, further comprising a movable carriage, and wherein said reading unit and said printing unit can be alternatively attached to said carriage.

12. An image processing method comprising:

a first moving step of relatively moving a reading unit having a line sensor and an original image in a subscanning direction of the line sensor;

a second moving step of relatively moving the reading unit and the original image in a main scanning direction of the line sensor;

a control step of controlling in a manner such that the reading unit reads a first reading range on the original through a relative movement in said first moving step, the relative movement in said second moving step being performed after reading the first reading range, and subsequently the reading unit reads a second reading range adjacent to the first reading range in the main scanning direction through the relative movement in said first moving step;

a detecting step of detecting a background density of the original image;

a determining step of detecting a background density in the first reading range on the basis of read data of the first reading range and for determining a binarization threshold value of the second reading range on the basis of the background density obtained in said detecting step and a present binarization threshold value of said first reading range before starting to read of said second reading range; and a binarizating control step of binarizing an image signal of the second reading range read by the reading unit using the binarization threshold value which is determined in said determining step before the reading of said second reading range.

13. A method according to claim 12, wherein said determining step includes determining the binarization threshold value so that a difference between the present binarization threshold value and the binarization threshold value which is used in the second reading range does not exceed a predetermined value.

14. A method according to claim 12, wherein the main scanning direction is a direction along which the line sensor is arranged, and the subscanning direction is a direction that perpendicularly crosses the main scanning direction.

15. A method according to claim 12, wherein said detecting step is performed by detecting means provided in the reading unit.

16. A method according to claim 12, wherein said determining step is performed by determining means provided in the reading unit.

17. A method according to claim 12, wherein said binarizing control step is performed by binarizing means provided in the reading unit.

18. A method according to claim 12, wherein the reading unit includes a light source to irradiate the original image.

19. A method according to claim 18, wherein the reading unit includes optical means for guiding a reflected light from the original image irradiated by the light source to the line sensor.

20. A method according to claim 19, wherein the reading unit includes amplifying means for amplifying an image signal which is output from the line sensor.

21. A method according to claim 12, further comprising a printing step of printing data using a printing unit.

22. A method according to claim 21, wherein the reading unit and the printing unit can be alternatively attached to a carriage which is movable.

* * * * *

UNITED STATES PATENT AND TRADEMARK OFFICE
CERTIFICATE OF CORRECTION

PATENT NO. : 6,108,456  
DATED : August 22, 2000  
INVENTOR(S) : Yamamoto

Page 1 of 1

It is certified that error appears in the above-identified patent and that said Letters Patent is hereby corrected as shown below:

Column 1,  
Line 46, "a" should be deleted.

Column 7,  
Line 38, "of" should be deleted.

Signed and Sealed this

Twenty-fifth Day of September, 2001

Attest:

*Nicholas P. Godici*

NICHOLAS P. GODICI  
*Acting Director of the United States Patent and Trademark Office*

*Attesting Officer*